G. H. CARPENTER.
ROLLER CAGE.
APPLICATION FILED AUG. 30, 1911.

1,018,694.

Patented Feb. 27, 1912.

WITNESSES:
Rob't R. Kitchel.

INVENTOR
George H. Carpenter
BY
Augustus B. Stoughton
ATTORNEY.

UNITED STATES PATENT OFFICE.

GEORGE H. CARPENTER, OF PHILADELPHIA, PENNSYLVANIA, ASSIGNOR TO STANDARD ROLLER BEARING COMPANY, OF PHILADELPHIA, PENNSYLVANIA, A CORPORATION OF NEW JERSEY.

ROLLER-CAGE.

1,018,694.  Specification of Letters Patent.  Patented Feb. 27, 1912.

Application filed August 30, 1911. Serial No. 646,816.

*To all whom it may concern:*

Be it known that I, GEORGE H. CARPENTER, a citizen of the United States, residing at the city of Philadelphia, in the county of Philadelphia and State of Pennsylvania, have invented a certain new and useful Roller-Cage, of which the following is a specification.

The principal object of the present invention is to provide a roller cage capable of manufacture from a sheet of metal by stamping, pressing, swaging and like operations and which shall be light, strong, rigid, comparatively inexpensive and at the same time adapted to receive and retain the rollers and present them properly for coöperation with the various parts of a taper roller bearing.

The invention will be claimed at the end hereof but will be first described in connection with the embodiment but not necessarily the only embodiment of it chosen for illustration in the accompanying drawings in which—

Figure 1:
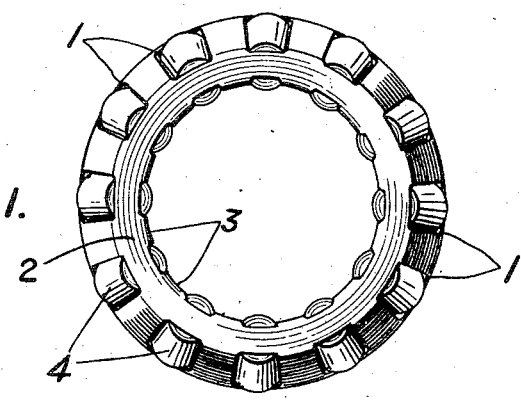
Figure 2:
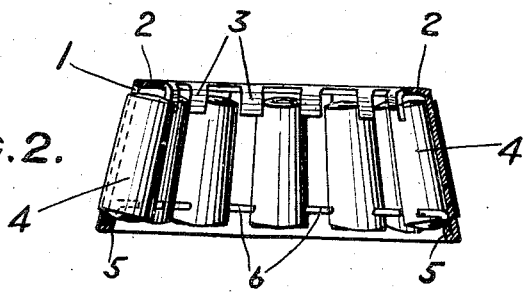
Figure 3:
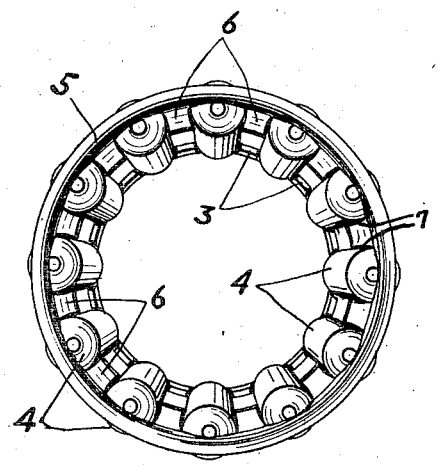

Figure 1, is an elevational view looking at the smaller end of the cage and showing the rollers in application thereto. Fig. 2, is a sectional view of the same, and Fig. 3, is an elevational view looking at the larger end of the cage.

The cage consists of a sheet of metal of the form of a conic frustum having a series of axially disposed slots 1. At the smaller end of the frustum there is a diametrically extending inward flange 2. This flange 2, is provided at its rim with projecting fingers 3, capable of being bent into substantial parallelism with the sheet, as shown in the drawings, after the rollers 4, have been inserted in place and capable of assuming generally diametrical positions to permit of the insertion of the rollers. At the larger end of the conic frustum there is an inturned fold 5, provided at its rim with diametrically ranging fingers 6, which are headed in the sense that their side walls are somewhat concave as shown at 7, in Fig. 3. From the foregoing description it is evident that the cage can be made from a flat ring or washer-like blank by stamping, swaging, pressing and like operations. The walls of the slots 1, and the side walls of the fingers 3 and 6, constitute roller pockets in which the rollers are retained in proper manner for coöperating with the race-ways of the taper roller bearing and with flanges that may be formed thereon, that is to say, the conical surfaces of the rollers are exposed both inside and outside the cage and portions of the ends of the rollers are exposed at the ends of the cage.

What I claim as new and desire to secure by Letters Patent is:

A roller cage consisting of a sheet of metal of the form of an axially slotted conic frustum having at one end a diametrically extending inward flange provided with projecting fingers capable of assuming substantial parallelism with the sheet and having at the other end an inturned fold provided with diametrically ranging headed fingers; and the walls of the slots and the side walls of the fingers constituting roller pockets, substantially as described.

In testimony whereof I have hereunto signed my name in presence of two witnesses.

GEORGE H. CARPENTER.

Witnesses:
  K. M. GILLIGAN,
  FRANK E. FRENCH.